United States Patent
Kuo

(10) Patent No.: US 8,804,628 B2
(45) Date of Patent: Aug. 12, 2014

(54) METHOD OF ENHANCING CONTINUOUS PACKET CONNECTIVITY IN A WIRELESS COMMUNICATIONS SYSTEM AND RELATED APPARATUS

(75) Inventor: Richard Lee-Chee Kuo, Taipei (TW)

(73) Assignee: Innovative Sonic Limited, Ebene (MU)

( * ) Notice: Subject to any disclaimer, the term of this patent is extended or adjusted under 35 U.S.C. 154(b) by 1053 days.

(21) Appl. No.: 11/987,496

(22) Filed: Nov. 30, 2007

(65) Prior Publication Data

US 2008/0130488 A1    Jun. 5, 2008

Related U.S. Application Data

(60) Provisional application No. 60/868,078, filed on Nov. 30, 2006.

(51) Int. Cl.
*H04W 4/00* (2009.01)
*H04W 76/04* (2009.01)
*H04L 12/56* (2006.01)
*H04W 60/04* (2009.01)

(52) U.S. Cl.
CPC .......... *H04W 76/048* (2013.01); *H04W 76/046* (2013.01); *H04L 47/10* (2013.01); *H04W 60/04* (2013.01)
USPC ........... 370/329; 370/328; 370/254; 370/252; 370/235; 370/216; 455/450; 455/436; 455/435.1

(58) Field of Classification Search
None
See application file for complete search history.

(56) References Cited

U.S. PATENT DOCUMENTS

| | | | |
|---|---|---|---|
| 6,301,479 B1 | 10/2001 | Roobol | |
| 6,618,589 B1 | 9/2003 | Rune | |
| 6,961,570 B2 | 11/2005 | Kuo | |
| 7,027,496 B2* | 4/2006 | Tapaninen | 375/227 |
| 7,209,747 B2* | 4/2007 | Chen | 455/450 |
| 7,266,105 B2* | 9/2007 | Wu | 370/338 |
| 7,272,396 B2 | 9/2007 | Obuchi | |
| 7,356,146 B2* | 4/2008 | Yi et al. | 380/262 |
| 7,406,314 B2 | 7/2008 | Sharma | |

(Continued)

FOREIGN PATENT DOCUMENTS

| | | |
|---|---|---|
| EP | 1 519 606 A1 | 3/2005 |
| EP | 1928131 A2 | 6/2008 |
| KR | 1020060014928 | 2/2006 |
| KR | 100626968 | 9/2006 |

(Continued)

OTHER PUBLICATIONS

3GPP TSG-RAN WG2 Meeting #56 Tdoc R2-063309, Title: Introduction of DTX-DRX and HS-SCCH less in RRC, Nov. 6-10, 2006, Riga, Latvia.

(Continued)

*Primary Examiner* — Ian N Moore
*Assistant Examiner* — Dung B Huynh
(74) *Attorney, Agent, or Firm* — Blue Capital Law Firm, P.C.

(57) ABSTRACT

In order to avoid system malfunction, the present invention provides a method of enhancing continuous packet connectivity, known as CPC, for a user equipment, known as UE, in a wireless communications system. The method includes the following steps. A discontinuous packet operation is activated according to a CPC_DTX_DRX_STATUS variable. The CPC_DTX_DRX_STATUS variable is re-determined when a radio link failure occurs, when a radio link control unrecoverable error occurs or when transmission of UE CAPABILITY INFORMATION fails, so as to deactivate the discontinuous packet operation. The discontinuous packet operation includes uplink discontinuous transmission, uplink discontinuous reception and downlink discontinuous reception operation.

8 Claims, 3 Drawing Sheets

(56) References Cited

U.S. PATENT DOCUMENTS

| | | | |
|---|---|---|---|
| 2003/0003895 A1* | 1/2003 | Wallentin et al. | 455/410 |
| 2003/0153309 A1* | 8/2003 | Bjelland et al. | 455/432 |
| 2003/0207702 A1* | 11/2003 | Chen | 455/574 |
| 2003/0236085 A1* | 12/2003 | Ho | 455/411 |
| 2004/0224686 A1* | 11/2004 | Pedlar | 455/435.1 |
| 2005/0009527 A1* | 1/2005 | Sharma | 455/445 |
| 2005/0054298 A1 | 3/2005 | Chen | |
| 2005/0070274 A1* | 3/2005 | Pedlar et al. | 455/432.1 |
| 2005/0207374 A1* | 9/2005 | Petrovic et al. | 370/331 |
| 2006/0084408 A1* | 4/2006 | Wan | 455/343.4 |
| 2006/0223537 A1 | 10/2006 | Kojima | |
| 2007/0111751 A1* | 5/2007 | Iimori | 455/550.1 |
| 2007/0133479 A1* | 6/2007 | Montojo et al. | 370/335 |
| 2007/0177569 A1 | 8/2007 | Lundby | |
| 2008/0008298 A1* | 1/2008 | Kirla | 379/88.03 |
| 2008/0039092 A1* | 2/2008 | Kitazoe | 455/436 |
| 2008/0046132 A1* | 2/2008 | Dalsgaard et al. | 700/299 |
| 2008/0049682 A1* | 2/2008 | Ding et al. | 370/335 |

FOREIGN PATENT DOCUMENTS

| | | |
|---|---|---|
| KR | 1020080049643 | 6/2008 |
| TW | 269046 B | 12/2006 |
| TW | 269171 B | 12/2006 |

OTHER PUBLICATIONS

3GPP TR 25.903 V1.2.0, Title: 3rd Generation Partnership Project; Technical Specification Group Radio Access Network; Continuous Connectivity for Packet Data Users; (Release 7), Nov. 2006.

Nokia et al., Title: Introduction of CPC, Nov. 6, 2006, pp. 1-7, 3GPP TSG-RAN-WG2 Meeting #56 R2-063592.

Qualcomm Europe: "TP on Reduced Complexity HS-SCCH-less Operation", 3GPP TSG-RAN WG1 #46, R1-062421, Aug. 28-Sep. 1, 2006, pp. 1-10, XP002594620, Tallinn, Estonia.

3GPP TSG-RAN WG2 Meeting #56 (Nov. 6 to 10, 2006), Change Request R2-063675 "Introduction of CPC" by Nokia, Qualcomm Europe, Ericsson, Siemens, Nortel, Vodafone, T-Mobile.

3GPP TSG-RAN WG2 Meeting #56 (Nov. 6 to 10, 2006), Change Request R2-063567 "Introduction of DTX-DRX and HS-SCCH less in RRC" by Qualcomm Europe, Nokia, Ericsson, Philips.

3GPP TS 25.331 V7.2.0 (Sep. 2006) Radio Resource Control (RRC); Protocol Specification (Release 7).

3GPP TS 25.331 V7.1.0 (Jun. 2006).

3GPP TSG-RAN WG2 Meeting #57 St Louis, Missouri, USA, Feb. 12-16, 2007 (R2-071071).

ETSI TS 125 331 V7.6.0 (Oct. 2007).

3GPP TSG-RAN WG2 Meeting #55 Seoul, Korea, Oct. 9-13, 2006 (R2-062976).

3GPP TSG-RAN WG1 Meeting #47 Riga, Latvia, Nov. 6-10, 2006 (R1-063621).

Communication of a notice of opposition on related EP Patent Application No. 07023252.5 dated Feb. 28, 2013.

I Office Action on corresponding foreign application (TW 96145736) from TIPO dated Dec. 22. 2011.

Office Action on corresponding foreign patent application (TW 96145741) from TIPO dated May 25, 2011.

* cited by examiner

METHOD OF ENHANCING CONTINUOUS PACKET CONNECTIVITY IN A WIRELESS COMMUNICATIONS SYSTEM AND RELATED APPARATUS

CROSS REFERENCE TO RELATED APPLICATIONS

This application claims the benefit of U.S. Provisional Application No. 60/868,078, filed on Nov. 30, 2006 and entitled "Method And Apparatus for Enhancing CPC related procedures in a Wireless Communications System", the contents of which are incorporated herein by reference.

BACKGROUND OF THE INVENTION

1. Field of the Invention

The present invention relates to a method and related communications device for enhancing operation of continuous packet connectivity, and more particularly, to a method and related communications device for enhancing discontinuous packet operation of continuous packet connectivity for a user equipment in a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate. For HSDPA and HSUPA, the 3rd Generation Partnership Project (3GPP) provides a Continuous Packet Connectivity (CPC) protocol specification, which includes features that, for user equipments (UEs) in CELL_DCH state, aim to significantly increase the number of packet data users for a cell, reduce the uplink noise rise and improve the achievable download capacity for VoIP.

For an HSDPA UE, physical channels include a high speed physical downlink shared channel (HS-PDSCH), for transferring payload data, and a high speed physical control channel (HS-DPCCH) for uploading an acknowledgement/negative acknowledgement (ACK/NACK) and a channel quality identifier (CQI). As for the media access control (MAC) layer of the HSDPA UE, a MAC-hs entity utilizes a transport channel of High Speed Downlink Shared Channel (HS-DSCH) for receiving data from the physical layer. In addition, a shared control channel for HS-DSCH (HS-SCCH) is used as a physical downlink channel, responsible for transmission of control signals corresponding to HS-DSCH, such as demodulation information.

For an HSUPA UE, physical channels includes two uplink channels: an enhanced dedicated transport channel dedicated physical data channel (E-DPDCH), for transferring payload data, and an E-DCH dedicated physical control channel (E-DPCCH) for transmission of control signals, such as retransmission numbers. Furthermore, a bundle of downlink physical channels are employed in the HSUPA system and used for transmitting control signals associated with grants, ACKs and etc. The downlink physical channels include E-DCH relative grant channel (E-RGCH), E-DCH absolute grant channel (E-AGCH), E-DCH HARQ acknowledgement indicator channel (E-HICH) and fractional dedicated physical channel (F-DPCH). As for the MAC layer of the HSUPA UE, a MAC-e/es entity utilizes a transport channel of enhanced dedicated transport channel (E-DCH) for transmitting MAC packet data to the physical layer with supporting a transmission time interval (TTI) of 10 milliseconds (ms) or 2 ms.

For CELL_DCH state, CPC operation defines an active state and an inactive state. For any data channels (ex. E-DCH), the active state represents that there are data packets transmitted on the data channels. For any control channels (ex. HS-DPCCH), the active state represents that there are data packets transmitted on the data channels corresponding to the control channels, such as HS-PDSCH corresponding to HS-DPCCH. On the contrary, for any data channels, the inactive state represents that there are no data packets transmitted on the data channels. For any control channels, the inactive state represents that there are no data packets transmitted on the data channels corresponding to the control channels.

According to the CPC protocol specification, discontinuous uplink transmission (uplink DTX) is a mechanism where control signals are transmitted on the uplink control channels according to defined discontinuous patterns during the inactive state of corresponding uplink data channels in order to maintain signal synchronization and power control loop with less control signaling. The uplink control channels include a normal DPCCH in addition to the abovementioned uplink control channels of HSUPA and HSDPA. The uplink DTX defines two patterns associated with parameters of UE_DTX_cycle_1 and UE_DTX_cycle_2. The former is applied depending on the duration of E-DCH inactivity while the latter adopts a longer transmission cycle and is applied to the inactivity of any uplink control channels. In each UE_DTX_cycle_pattern, the UE shall not transmit data on DPCCH except for a short burst of UE_DPCCH_burst_subframes. For example, if the UE_DTX_cycle_1 is set to be four E-DPCCH subframes, the UE transmits a short burst of UE_DPCCH_burst_1 in the first E-DPCCH subframe and stops DPCCH transmission in subsequent three E-DPCCH subframes. In addition, according to an Inactivity_threshold_for_UE_DTX_cycle_2 parameter, the UE can determine whether to transmit a shot burst of UE_DPCCH_burst_2 subframes once every UE_DTX_cycle_2 pattern. UE_DTX_DRX_Offset is used for controlling active time of UE_DTX_cycle_1/2 pattern, allowing different UEs to have uplink transmission phase at different times.

Discontinuous uplink reception (uplink DRX) of CPC is utilized to control the UE to transmit E-DCH in specific time interval and has to be configured with uplink DTX. If there has been no E-DCH transmission for a configurable number of transmission time intervals (ex. the interval of UE_inactivity_Threshold), a radio network controller (RNC) can configure the UE to restrict the start of E-DCH transmission to a MAC_DTX_cycle pattern. UE_DTX_DRX_Offset is also used in uplink DRX, allowing the UEs to have different E-DCH start time.

Discontinuous downlink reception (downlink DRX) of CPC is configured by the RNC and allows the UE to restrict the downlink reception times in order to reduce power consumption. When the downlink DRX is enabled, the UE is not required to receive physical downlink channels except for several specific situations, which refer to 3GPP TSG-RAN WG2 #56 R2-063567. If the UE listens to HS-SCCH with downlink DRX, the UE receives one HS-SCCH subframe according to subframes of a UE_DRX_cycle pattern. For example, if the UE_DRX_cycle pattern is set to be four HS-SCCH subframes, the UE receives one HS-SCCH subframe and rests in the subsequent three HS-SCCH subframes. UE_DTX_DRX_Offset is used for staggering different start time of HS-SCCH reception for the different UEs. Furthermore, Downlink DRX has to be configured with uplink DTX configuration.

As to radio resource control (RRC), the UE and the network, such as the Node-B or a radio network controller (RNC), can configure DTX/DRX operation by exchanging RRC messages and information elements (IEs) that include the abovementioned parameters and modes. According to the RRC protocol specification of 3GPP, a Continuous Packet Connectivity Timing information IE is provided to include a number of timing information parameters (ex. UE_DTX_DRX_Offset) for delaying the start of CPC operation in reconfiguration and offsetting the uplink transmission pattern between different UEs. The timing information can be used to switch off and on the CPC operation and indicate if the current CPC parameters are kept during reconfiguration procedures so that sending full parameter list can be avoid. In addition, a Continuous Packet Connectivity DTX-DRX information IE includes configuration of UE_DTX_cycle_1/2, UE_DPCCH_burst_1/2, Inactivity_threshold_for_UE_DTX_cycle_2, MAC_DTX_cycle and other parameters. The above IEs can be included in RRC CONNECTION SETUP, ACTIVE SET UPDATE, CELL UPDATE CONFIRM or other reconfiguration messages, and can be transmitted to the UE through RRC procedures. On the other hand, the UE stores the DTX/DRX configuration received in the reconfiguration messages into a CPC_DTX_DRX_PARAMS variable.

Furthermore, the UE includes a CPC_DTX_DRX_STATUS variable having two possible values of "TRUE" and "FALSE, which represent the in-use state and the out-of-use state of the DTX/DRX operation, respectively. According to the RRC specification, the UE is required to determine the value for CPC_DTX_DRX_STATUS variable if receiving any reconfiguration messages. Under the CPC_DTX_DRX_STATUS determination, the CPC_DTX_DRX_STATUS variable shall be set to "TRUE" when all of the following conditions are met:
 1. the UE is in CELL_DCH state;
 2. both HS_DSCH RECEPTION and E_DCH_TRANSMISSION variables are set to "TRUE";
 3. no DCH transport channel is configured;
 4. the CPC_DTX_DRX_PARAMS is set;
 5. the UE has received a Continuous Packet Connectivity timing information IE from the latest reconfiguration message.

If any of the above conditions is not met and the CPC_DTX_DRX_STATUS variable is set to be "TRUE", the UE shall:
 1. set the CPC_DTX_DRX_STATUS variable to be "FALSE";
 2. clear the CPC_DTX_DRX_PARAMS variable;
 3. stop all related activities of DTX/DRX operation.

Whenever the CPC_DTX_DRX_STATUS variable is set to "TRUE", the UE shall configure the physical and MAC layers to operate according to the CPC_DTX_DRX_PARAMS variable.

According to the above, the UE determines the value for the CPC_DTX_DRX_STATUS variable only when receiving reconfiguration messages, and the DTX/DRX operation is only applied to the UE in CELL_DCH. If a radio link failure or a radio link control (RLC) unrecoverable error occurs or if transmission of a UE CAPABILITY INFORMATION message fails during DTX/DRX operation, the UE shall perform a cell update procedure to remedy those situations. When initiating the cell update procedure, the UE shall move to CELL_FACH state and select a suitable UMTS radio access (UTRA) cell for submitting a CELL UPDATE message. However, the prior art specification specifies no related actions of DTX/DRX operation under the abovementioned situations. As a result, the UE of the prior art does not re-determine the CPC_DTX_DRX_STATUS variable when moving out of CELL_DCH state. That is, the UE continues applying DTX/DRX operation in CELL_FACH state, which is not applicable for DTX/DRX operation. This may cause severe errors in the physical and MAC layers of the UE.

The radio link failure may occur when the UE is situated in poor signal distributing area, such as a basement or rural area with small coverage. The RLC unrecoverable error is likely to occur due to many causes, such as RLC reset errors or RLC recovery errors. The UE CAPABILITY INFORMATION message is utilized to notify the UTRAN of information of specific UE capability (ex. radio access capability).

SUMMARY OF THE INVENTION

The present invention provides a method and related communications device for managing a discontinuous packet operation of CPC for a user equipment in a wireless communications system to avoid system malfunction.

The present invention discloses a method of enhancing CPC for a UE in a wireless communications system. The method includes activating a discontinuous packet operation according to a status variable, and re-determining the status variable and performing corresponding actions when a cell update procedure is initiated. The discontinuous packet operation comprises uplink discontinuous transmission operation, uplink discontinuous reception operation and downlink discontinuous reception operation, and the state variable is preferably CPC_DTX_DRX_STATUS variable.

The present invention further discloses a communications device of a wireless communications system for CPC enhancement to prevent system malfunction. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes activating a discontinuous packet operation according to a status variable, and re-determining the status variable and performing corresponding actions when a cell update procedure is initiated. The discontinuous packet operation comprises uplink discontinuous transmission operation, uplink discontinuous reception operation and downlink discontinuous reception operation, and the state variable is preferably CPC_DTX_DRX_STATUS variable. These and other objectives of the present invention will no doubt become obvious to those of ordinary skill in the art after reading the following detailed description of the preferred embodiment that is illustrated in the various figures and drawings.

DETAILED DESCRIPTION

Figure 1:
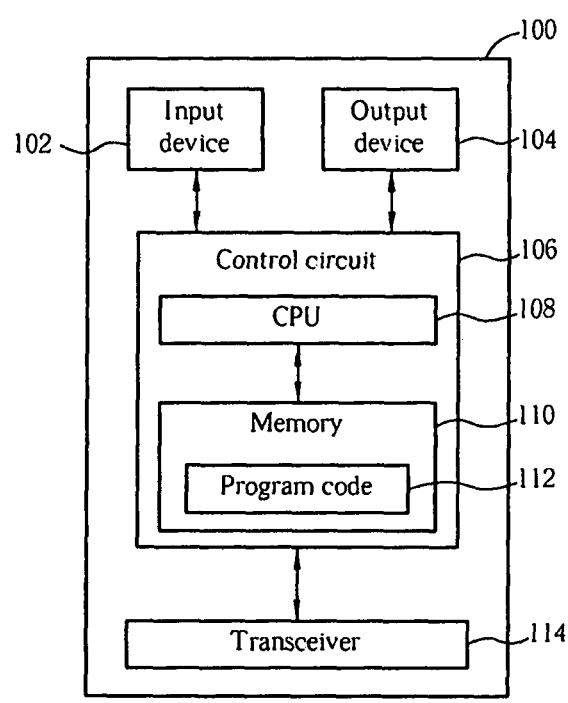
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system, supporting Continuous Packet Connectivity (CPC).

Figure 2:
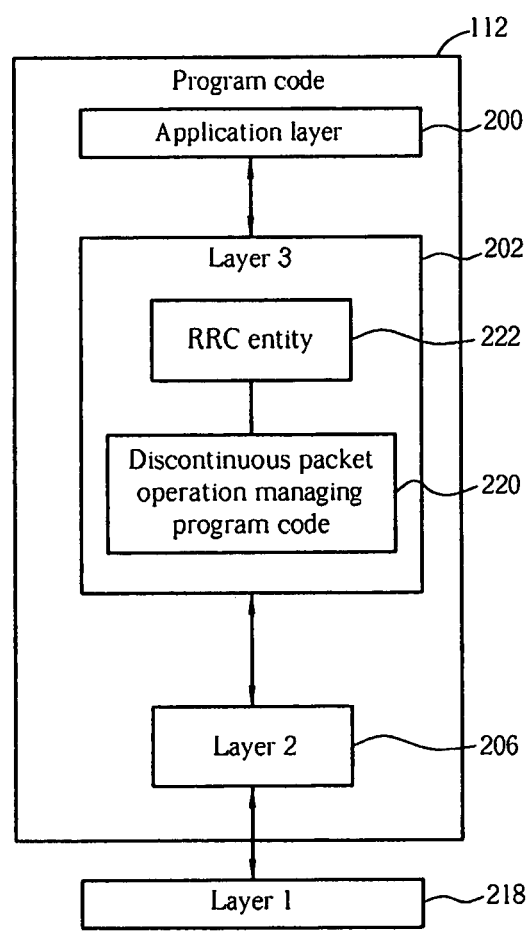
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for controlling the Layer 1 218 and the Layer 2 206 and performing peer-to-peer RRC communication with other communications devices, such as a Node-B or a UTRAN. In addition, the RRC entity 222 can change an RRC state of the communications device 100, switching between an Idle mode, CELL_PCH, URA_PCH, CELL_FACH or CELL_DCH state.

The Layer 2 206 includes a radio control link (RLC) layer and a media access control (MAC) layer, and the Layer 1 218 is physical layer. When the HSDPA is in use, the MAC layer listens to HS-SCCH for HS-DSCH signaling reception and thereby receives packet data by listening to HS-DSCH. Besides, HS-PDSCH and HS-DPCCH are used for exchanging payload data between the communications device 100 and the network. When the HSUPA is in use, the MAC layer transmits packets through E-DCH while the physical layer exchanges payload data and related control signals with the Node-B or the UTRAN through E-DPDCH, E-DPCCH, E-RGCH, E-AGCH, E-HICH and F-DPCH.

A network communications device can form RRC messages and information elements (IEs) to transmit CPC configuration to the communications device 100 via radio bearers. The reconfiguration messages, such as RRC CONNECTION SETUP, ACTIVE SET UPDATE or CELL UPDATE CONFIRM message, are allowed to include parameters of DTX/DRX operation of CPC, where DTX/DRX is well know as discontinuous transmission/reception. Accordingly, the communications device 100 stores received parameters into a CPC_DTX_DRX_PARAMS variable and thereby changes operation of the Layer 2 206 and the Layer 1 218. Furthermore, the communications device 100 includes a CPC_DTX_DRX_STATUS variable having two possible values of "TRUE" and "FALSE", which represent an in-use state and an out-of-use state of the DTX/DRX operation, respectively.

Figure 3:
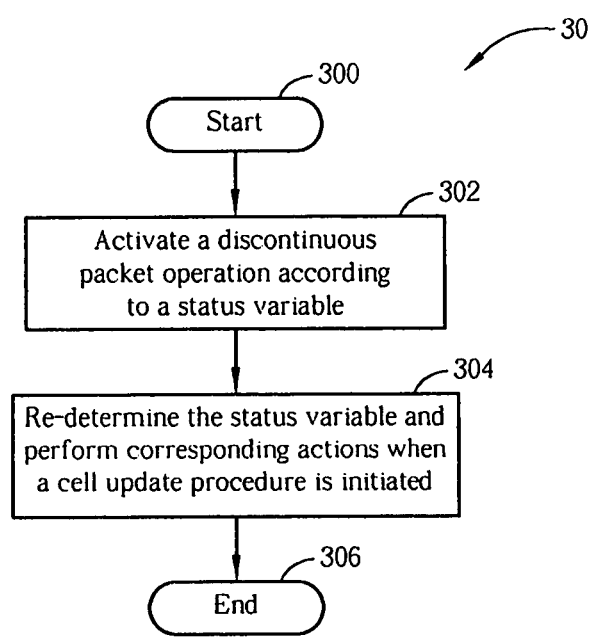
FIG. 3 is a flowchart diagram of a process according to an embodiment of the present invention.

In this situation, the embodiment of the present invention provides a discontinuous packet operation managing program code 220 for the program code 112 to avoid system malfunction when the UE initiates a cell update procedure during discontinuous packet operation. Please refer to FIG. 3, which illustrates a schematic diagram of a process 30 according to an embodiment of the present invention. The process 30 is utilized for managing discontinuous packet operation of CPC for a UE in a wireless communications system, and can be compiled into the discontinuous packet operation managing program code 220. The process 30 includes the following steps:

Step 300: Start.
Step 302: Activate a discontinuous packet operation according to a status variable.
Step 304: Re-determine the status variable and perform corresponding actions when a cell update procedure is initiated.
Step 306: End.

In the process 30, the discontinuous packet operation is preferably DTX/DRX operation of CPC, including uplink discontinuous transmission (uplink DTX), uplink discontinuous reception (uplink DRX) and downlink discontinuous reception (downlink DRX). The state variable is preferably CPC_DTX_DRX_STATUS variable. When CPC_DTX_DRX_STATUS variable is set to "TRUE", the DTX/DRX operation is activated. When a radio link failure or an RLC unrecoverable error occurs or when transmission of a UE CAPABILITY INFORMATION message fails during DTX/DRX operation, the cell update procedure is triggered to remedy those situations. When the cell update procedure is initiated, the UE moves to CELL_FACH state for selection of a suitable UTRA cell, and moreover the CPC_DTX_DRX_STATUS variable is re-determined by determining whether all of the abovementioned conditions are met for setting the CPC_DTX_DRX_STATUS variable to be "TRUE". Since the UE no longer stays in CELL_DCH state, the conditions required setting the CPC_DTX_DRX_STATUS variable to be "TRUE" are not all met. The UE then performs corresponding actions, which include:

1. set the CPC_DTX_DRX_STATUS variable to be "FALSE" if the CPC_DTX_DRX_STATUS variable is originally set to be "TRUE";
2. clear the CPC_DTX_DRX_PARAMS variable;
3. stop all related activities of DTX/DRX operation, such as stopping discontinuous transmission of HS-DPCCH belonging to uplink DTX, stopping discontinuous reception of E-DCH belonging to uplink DRX or stopping discontinuous reception of HS-SCCH belonging to downlink DRX.

Through the above actions, the DTX/DRX operation can be successfully stopped when the cell update procedure is initiated.

In addition, an alternative of stopping DTX/DRX operation is performing the abovementioned actions directly without re-determining the CPC_DTX_DRX_STATUS variable after a suitable UTRA cell is selected by the UE during the cell update procedure. Thus, when a radio link failure or an RLC unrecoverable error occurs or when transmission of a UE CAPABILITY INFORMATION message fails, the UE can timely stop DTX/DRX operation of the physical and MAC layers to avoid system malfunction.

In conclusion, the embodiment of the present invention specifies the UE to stop DTX/DRX operation when a radio link failure or an RLC unrecoverable error occurs or when transmission of a UE CAPABILITY INFORMATION message fails.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing continuous packet connectivity. abbreviated to CPC, for a user equipment, called LIE hereinafter, in a wireless communications system, the method comprising:
activating a discontinuous packet operation according to a status variable, wherein the discontinuous packet operation is applied to the UE in a CELL_DCH state;
initiating a cell update procedure, thereby the UE moving to a CELL_FACH state;
re-determining the status variable and stopping all related activities of the discontinuous packet operation; and
transmitting a CELL UPDATE message after re-determining the status variable and stopping all related activities of the discontinuous packet operation.

2. The method of claim 1, wherein the discontinuous packet operation comprises uplink discontinuous transmission operation, uplink discontinuous reception operation and downlink discontinuous reception operation, and the status variable is CPC_DTX_DRX_STATUS variable.

3. The method of claim 1, wherein the cell update procedure is initiated due to radio link failure, radio link control unrecoverable error or failed transmission of a UE CAPABILITY INFORMATION message.

4. The method of claim 1 further comprising:
setting he status variable to be "FALSE" if the status variable is originally set to be "TRUE";
clearing a parameter variable corresponding to the discontinuous packet operation: and
wherein the status variable is CPC_DTX_DRX_STATUS variable, and the parameter variable is CPC_DTX_DRX_PARAMS variable.

5. A communications device of a wireless communications system utilized for continuous packet connectivity, abbreviated to CPC, enhancement, the communications device comprising:
a control circuit for realizing functions of the communications device:
a central processing installed in the control circuit for executing a program code to operate the control circuit: and
a memory coupled to the central processing unit for storing the program code;
wherein the program code comprises:
activating a discontinuous packet operation according to a status variable, wherein the discontinuous packet operation is applied to the UE in a CELL_DCH state:
initiating a cell update procedure, thereby the UE moving to a CELL_FACH state;
re-determining the status variable and stopping all activities of the discontinuous packet operation; and
transmitting a CELL UPDATE message after re-determining the status variable and stopping all related activities of the discontinuous packet operation.

6. The communication device of claim 5, wherein the discontinuous packet operation comprises uplink discontinuous transmission operation, uplink discontinuous reception operation and downlink discontinuous reception operation, and the status variable is CPC_DTX_DRX_STATUS variable.

7. The communications device of claim 5, wherein the cell update procedure is initiated due to radio link failure, radio link control unrecoverable error or failed transmission of a UE CAPABILITY INFORMATION message.

8. The communications device of claim 5, further comprising:
setting the status variable to be "FALSE" if the status variable is originally set to be "TRUE";
clearing a parameter variable corresponding to the discontinuous packet operation: and
where the status variable is CPC_DTX_DRC_STATUS variable, and the parameter variable is CPC_DTX_DRX_PARAMS variable.

* * * * *